United States Patent
Ibusuki et al.

(10) Patent No.: US 10,008,224 B2
(45) Date of Patent: Jun. 26, 2018

(54) MAGNETIC READ HEAD WITH FLOATING TRAILING SHIELD

(71) Applicant: HGST Netherlands B.V., Amsterdam (NL)

(72) Inventors: Takahiro Ibusuki, Shinagawa (JP); Kouji Kataoka, Odawara (JP); Takashi Wagatsuma, Odawara (JP); Norihiro Okawa, Odawara (JP); Yukimasa Okada, Odawara (JP)

(73) Assignee: Western Digital Technologies, Inc., San Jose, CA (US)

( * ) Notice: Subject to any disclaimer, the term of this patent is extended or adjusted under 35 U.S.C. 154(b) by 0 days. days.

(21) Appl. No.: 15/068,476

(22) Filed: Mar. 11, 2016

(65) Prior Publication Data

US 2017/0263273 A1  Sep. 14, 2017

(51) Int. Cl.
*G11B 5/39* (2006.01)
*G11B 5/31* (2006.01)

(52) U.S. Cl.
CPC .......... *G11B 5/3912* (2013.01); *G11B 5/3903* (2013.01); *G11B 5/3163* (2013.01); *G11B 5/3909* (2013.01); *G11B 2005/3996* (2013.01)

(58) Field of Classification Search
CPC ............................ G11B 5/3903; G11B 5/3912
USPC ................................ 360/319, 324.1, 324.12
See application file for complete search history.

(56) References Cited

U.S. PATENT DOCUMENTS

| | | | |
|---|---|---|---|
| 6,621,667 B1 | 9/2003 | He et al. | |
| 7,446,980 B2 | 11/2008 | Le | |
| 7,656,621 B2 | 2/2010 | Shimazawa et al. | |
| 8,568,602 B2 | 10/2013 | Sakamoto et al. | |
| 8,743,507 B1* | 6/2014 | Hassan | G01R 33/093 360/125.3 |
| 9,019,664 B2 | 4/2015 | Song et al. | |
| 9,053,720 B1* | 6/2015 | Chye | G11B 5/3912 |
| 9,183,858 B2 | 11/2015 | Okawa et al. | |
| 9,406,319 B1* | 8/2016 | Biskeborn | G11B 5/3143 |
| 2002/0024778 A1 | 2/2002 | Xue et al. | |
| 2004/0100737 A1* | 5/2004 | Nakamoto | G11B 5/3912 360/319 |
| 2009/0174968 A1* | 7/2009 | Singleton | G11B 5/398 360/319 |
| 2009/0325319 A1* | 12/2009 | Horng | B82Y 25/00 438/3 |
| 2011/0279923 A1* | 11/2011 | Miyauchi | B82Y 10/00 360/75 |
| 2013/0293225 A1* | 11/2013 | Singleton | B82Y 25/00 324/252 |
| 2014/0252518 A1* | 9/2014 | Zhang | H01L 43/12 257/422 |

(Continued)

*Primary Examiner* — Jefferson Evans
(74) *Attorney, Agent, or Firm* — Foley & Lardner LLP

(57) ABSTRACT

A magnetic read element having an additional magnetic layer, "a floating magnetic shield", formed as a part of a capping structure of a magnetoresistive element. The capping structure is formed over the magnetic free layer and includes a magnetic layer that is located between first and second non-magnetic layers. The magnetic layer can advantageously be formed with a high magnetic permeability for increased signal amplitude and increased signal resolution. In addition, because the magnetic layer of the capping layer structure acts as a magnetic shield, it can reduce effective magnetic gap spacing for increased signal resolution.

20 Claims, 10 Drawing Sheets

(56) References Cited

U.S. PATENT DOCUMENTS

| | | | | |
|---|---|---|---|---|
| 2015/0085395 A1* | 3/2015 | Yoshida | ............... | G11B 5/3932 360/75 |
| 2015/0325260 A1* | 11/2015 | Singleton | ............. | G11B 5/3932 360/319 |
| 2016/0027458 A1* | 1/2016 | Okawa | ................. | G11B 5/3929 360/319 |

* cited by examiner

_US 10,008,224 B2_

MAGNETIC READ HEAD WITH FLOATING TRAILING SHIELD

FIELD OF THE INVENTION

The present invention relates to magnetic data recording and more particularly to a magnetic sensor having a capping layer that includes a high magnetic permeability magnetic layer for improved signal resolution.

BACKGROUND

At the heart of a computer is an assembly that is referred to as a magnetic disk drive. The magnetic disk drive includes a rotating magnetic disk, write and read heads that are suspended by a suspension arm adjacent to a surface of the rotating magnetic disk and an actuator that swings the suspension arm to place the read and write heads over selected tracks on the rotating disk. The read and write heads are directly located on a slider that has an air bearing surface (ABS). The suspension arm biases the slider into contact with the surface of the disk when the disk is not rotating, but when the disk rotates air is swirled by the rotating disk. When the slider rides on the air bearing, the write and read heads are employed for writing magnetic impressions to and reading magnetic impressions from the rotating disk. The read and write heads are connected to processing circuitry that operates according to a computer program to implement the writing and reading functions.

The write head includes at least one coil, a write pole and one or more return poles. When current flows through the coil, a resulting magnetic field causes a magnetic flux to flow through the coil, which results in a magnetic write field emitting from the tip of the write pole. This magnetic field is sufficiently strong that it locally magnetizes a portion of the adjacent magnetic media, thereby recording a bit of data. The write field then, travels through a magnetically soft under-layer of the magnetic medium to return to the return pole of the write head.

A magnetoresistive sensor such as a Giant Magnetoresistive (GMR) sensor or a Tunnel Junction Magnetoresistive (TMR) sensor can be employed to read a magnetic signal from the magnetic media. The magnetoresistive sensor has an electrical resistance that changes in response to an external magnetic field. This change in electrical resistance can be detected by processing circuitry in order to read magnetic data from the magnetic media.

SUMMARY

The present invention provides a magnetic sensor for magnetic data recording that includes a magnetic pinned layer structure, a magnetic free layer stricture and a nonmagnetic barrier located between the magnetic pinned layer structure and the magnetic free layer structure. The magnetic sensor also includes a novel capping layer located over the magnetic free layer structure. The novel capping layer includes a magnetic layer that is located between first and second nonmagnetic layers.

The presence of the magnetic layer advantageously improves signal amplitude and signal to noise ratio and also improves signal resolution by reducing the effective read gap of the sensor. The magnetic layer of the capping layer structure acts as a floating magnetic shield that is not physically connected with the trailing magnetic shield.

Because the magnetic layer of the capping layer structure can be formed in the same deposition and patterning processes used to form the magnetic free layer, it can advantageously be formed to have substantially the same shape as the free layer and to have a very high magnetic permeability, similar to that of the magnetic free layer.

These and other features and advantages of the invention will be apparent upon reading of the following detailed description of the embodiments taken in conjunction with the figures in which like reference numeral indicate like elements throughout.

BRIEF DESCRIPTION OF THE DRAWINGS

For a fuller understanding of the nature and advantages of this invention, as well as the preferred mode of use, reference should be made to the following detailed description read in conjunction with the accompanying drawings which are not to scale.

DETAILED DESCRIPTION

The following description is of the best embodiments presently contemplated for carrying out this invention. This description is made for the purpose of illustrating the general principles of this invention and is not meant to limit the inventive concepts claimed herein.

Figure 1:
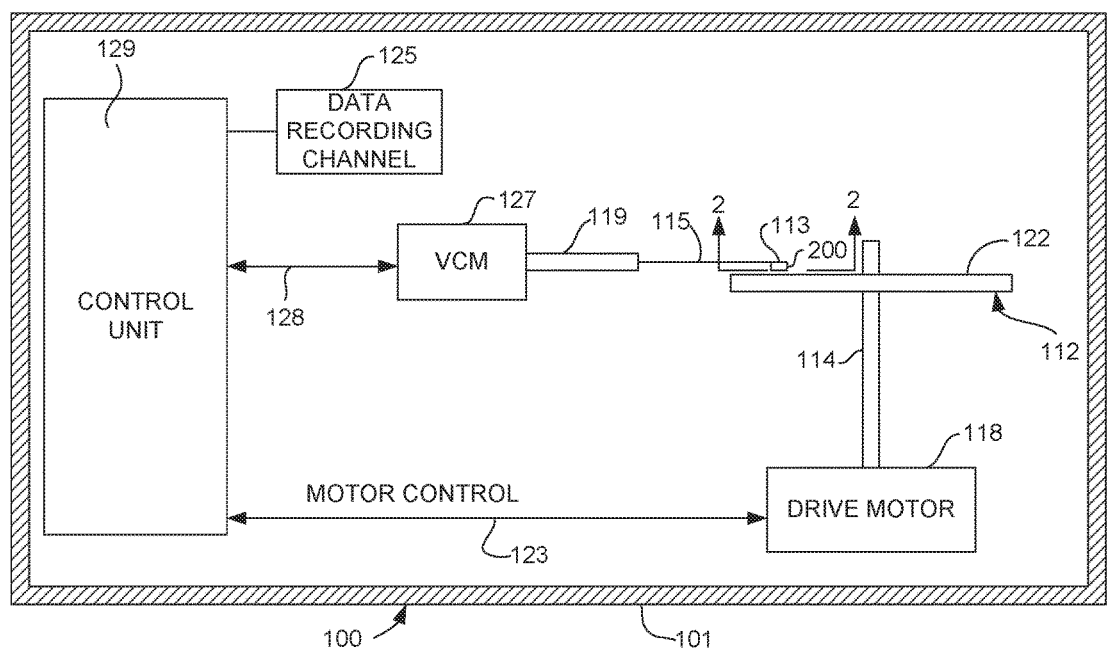
FIG. 1 is a schematic illustration of a disk drive system in which the invention might be embodied.

Referring now to FIG. 1, there is shown a disk drive 100. The disk drive 100 includes a housing 101. At least one rotatable magnetic disk 112 is supported on a spindle 114 and rotated by a disk drive motor 118. The magnetic recording on each disk may be in the form of annular patterns of concentric data tracks (not shown) on the magnetic disk 112.

At least one slider 113 is positioned near the magnetic disk 112, each slider 113 supporting one or more magnetic head assemblies 200. As the magnetic disk rotates, the slider 113 moves in and out over the disk surface 122 so that the magnetic head assembly 121 can access different tracks of the magnetic disk where desired data are written. Each slider 113 is attached to an actuator arm 119 by way of a suspension 115. The suspension 115 provides a slight spring force which biases the slider 113 against the disk surface 122. Each actuator arm 119 is attached to an actuator means 127. The actuator means 127 as shown in FIG. 1 may be a voice coil motor (VCM). The VCM comprises a coil movable within a fixed magnetic field, the direction and speed of the coil movements being controlled by the motor current signals supplied by the controller 129.

During operation of the disk storage system, the rotation of the magnetic disk 112 generates an air bearing between the slider 113 and the disk surface 122, which exerts an upward force or lift on the slider. The air bearing thus counter-balances the slight spring force of the suspension 115 and supports the slider 113 off and slightly above the disk surface by a small, substantially constant spacing during normal operation.

The various components of the disk storage system are controlled in operation by control signals generated by control unit 129, such as access control signals and internal clock signals. Typically, the control unit 129 comprises logic control circuits, and a microprocessor. The control unit 129 generates control signals to control various system operations such as drive motor control signals on line 123 and head position and seek control signals on line 128. The control signals on line 128 provide the desired current profiles to optimally move and position the slider 113 to the desired data track on the media 112. Write and read signals are communicated to and from write and read heads 200 by way of recording channel 125.

Figure 2:
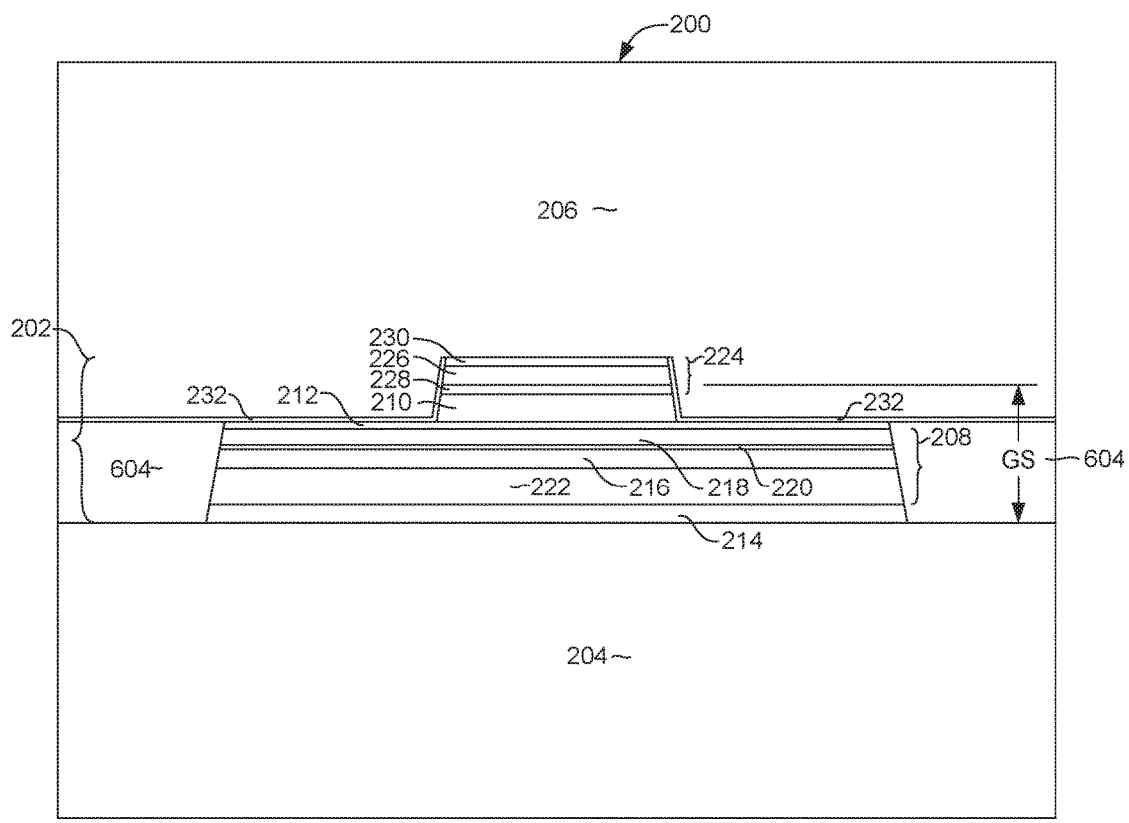
FIG. 2 is an ABS view of a slider illustrating the location of a magnetic head thereon.

FIG. 2 shows an enlarged view of a portion of the magnetic read head 200 as seen from the media facing surface. The magnetic read head includes a sensor stack 202 that is sandwiched between a leading magnetic shield 204 and a trailing magnetic shield 206. The sensor stack 202 includes a magnetic pinned layer structure 208, a magnetic free layer structure 210 and a non-magnetic barrier layer or spacer layer 212 located between the pinned layer structure 208 and magnetic free layer structure 210. An under-layer 214 can be provided at the bottom of the sensor stack 202 in order to promote a desired grain structure in the above deposited layers.

The pinned layer structure 208 can include first and second magnetic layers 216, 218 separated by a non-magnetic anti-parallel coupling layer 220. A layer of antiferromagnetic material such as Ir—Mn 222 can be exchange coupled with the first magnetic layer 216, which pins the magnetization of the layer 216 in a first direction perpendicular to the media facing surface. Anti-parallel coupling of the magnetic layers 216, 218 pins the magnetization of the second layer 218 in an opposite direction also perpendicular to the media facing surface.

The magnetic free layer 210 has a magnetization that is biased in a direction that is generally parallel with the media facing surface. Biasing of the magnetization of the free layer 210 can be provided by magnetic fields from the trailing magnetic shield 206. As can be seen, the trailing magnetic shield 206 wraps around the free layer 210 so that it provides side shielding as well as trailing shielding. These side shield portions of the trailing magnetic shield 206 can be magnetized so that they provide a magnetic bias field to bias the free layer 210.

The sensor stack 202 includes a novel capping layer structure 224 that is formed over the magnetic free layer 210 and trailing magnetic shield 206. The novel capping layer structure 224 includes a magnetic layer 226 that is located between first and second non-magnetic layers 228, 230. The magnetic layer 226 is formed of a material having a high magnetic permeability, preferably at least 1000 H/m and can include Fe, Co, Ni or alloys thereof. The non-magnetic layers 228, 230 can be formed of Ru, Rh, Hf, Ta, Cr or alloys thereof. The sides of the capping layer structure 224 and magnetic free layer 210 can be separated from the shield 206 by a non-magnetic, electrically insulating layer such as alumina 232. In addition, a non-magnetic, electrically insulating fill layer such as alumina 604 can fill the space at either side of the pinned layer structure 208.

The presence of the magnetic layer 226 in the capping structure 224 improves signal resolution and Bit Error Rate (BER). The magnetic layer 226 (floating shield layer) acts as a magnetic shield layer that, while not magnetically connected with the trailing shield 206, acts functionally as a trailing magnetic shield. Because the magnetic layer 226 functions as a magnetic shield, it can reduce the effective magnetic gap spacing, thereby improving signal resolution. The gap spacing GS can be measured from the leading shield 204 to the bottom of the magnetic layer 226, rather than to the trailing shield 206 at the top of the cap layer 224. Therefore, the gap spacing is reduced by an amount that is equivalent to the combined thickness of the magnetic layer 226 and second non-magnetic layer 230.

In addition, the presence of the floating shield layer 226 can improve bit error rate (BER), by increasing signal amplitude and signal to noise ratio. Bit error rate (BER) depends upon the performance of the system at high recording density, and the influence of 2 track signal to noise ratio and 3 track signal to noise ratio is important to the BER of the magnetic recording system.

High signal amplitude and low signal noise are necessary to improve performance at high recording density. The signal amplitude at high recording density depends upon magnetic permeability of the shield 206. However, increasing the permeability of the shield 206 is difficult and impractical. The presence of the floating shield 226 overcomes this dilemma, because the floating shield 226 can be made to have a very high magnetic permeability.

In a magnetic read head, the magnetic free layer 210 generally has the highest permeability of all of the layers of the read sensor 200, because the free layer 210 has a small patterned structure. The floating shield layer 226 has a similar small patterned structure. The floating shield layer 226 has a width and a depth that are substantially the same as a width and a depth of the magnetic free layer 210, "substantially the same" meaning here that the width and the depth of the floating shield layer 226 are within 5% of the width and depth of the magnetic free layer 210. As a result, the floating shield layer has high permeability too. In addition, because the floating shield layer 226 is formed by the same process that is used to define the free layer 210, the thickness of the floating shield layer 226 and the effective gap thickness GS can be carefully controlled by deposition thickness rather than by a material removal process such as chemical mechanical polishing (CMP). This will be better understood below upon discussion of a process for manufacturing a magnetic sensor.

The magnetic layer 226 of the capping layer structure 224 preferably has a thickness of less than 4 nm. The first nonmagnetic layer 228 of the capping layer structure 224 can have a thickness of 1 to 4 nm. The second nonmagnetic layer 230 of the capping layer structure 224 preferably has a thickness of less than 2 nm, because a thick second nonmagnetic layer 230 could decrease signal amplitude at low recording density.

The magnetic layer 226 can have its magnetization biased in a direction substantially parallel with the media facing surface by a bias field from the trailing magnetic shield 206.

Figure 3:
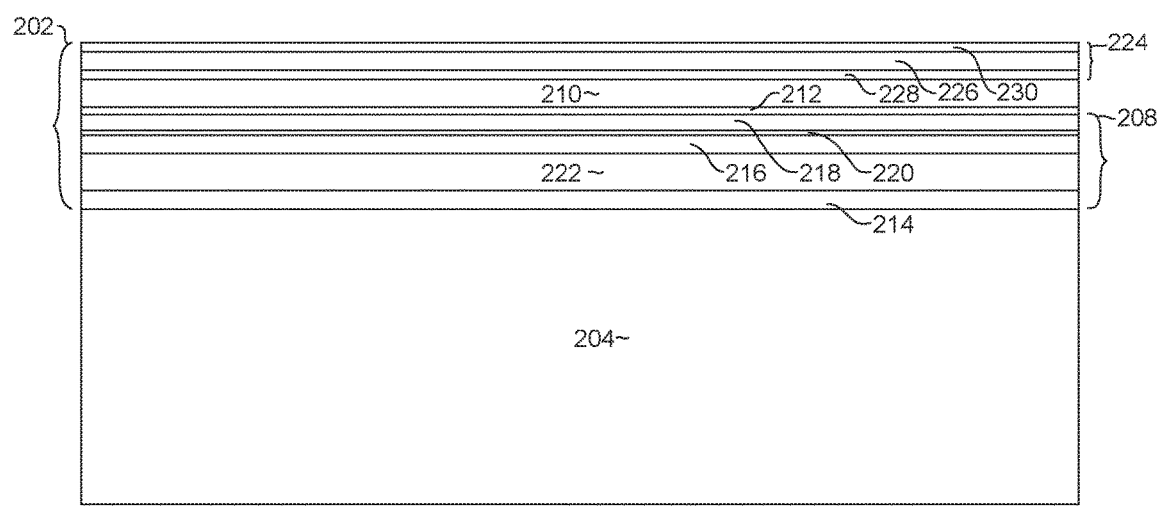
FIGS. 3-10 are views of a magnetic sensor in various intermediate stages of manufacture in order to illustrate a method of manufacturing a magnetic sensor.

FIGS. 3-10 show a view of a magnetic sensor in various intermediate stages of manufacture in order to illustrate a method for manufacturing a magnetic sensor. The views of FIGS. 3-10 are of a plane parallel with a media facing surface plane of a finished sensor. With particular reference to FIG. 3, a series of sensor stack layers 202 are deposited full film over a previously constructed leading shield structure 204. The sensor layers can include an under-layer 214, and a pinned layer structure 208 deposited over the under-layer 214. A non-magnetic spacer or barrier layer 212 is deposited over the pinned layer structure 208. A magnetic free layer 210 is deposited over the non-magnetic spacer or barrier layer 212, and a capping layer structure 224 is deposited over the magnetic free layer 210.

The pinned layer structure 208 can include a layer of antiferromagnetic material such as IrMn 222, first and second magnetic layers 216, 218 and a non-magnetic anti-parallel coupling layer 220 located between the first and second magnetic layers 216, 218. The capping layer structure 224 includes a first nonmagnetic layer 228, a magnetic layer 226 deposited over the first non-magnetic layer 228 and a second non-magnetic layer 230 deposited over the magnetic layer 226. As discussed above, the first and second non-magnetic layers 228, 230 can be Ru, Rh, Ta, Cr or alloys thereof. The magnetic layer 226 can be Fe, Co, Ni or alloys thereof chosen to have a high magnetic permeability.

Figure 4:
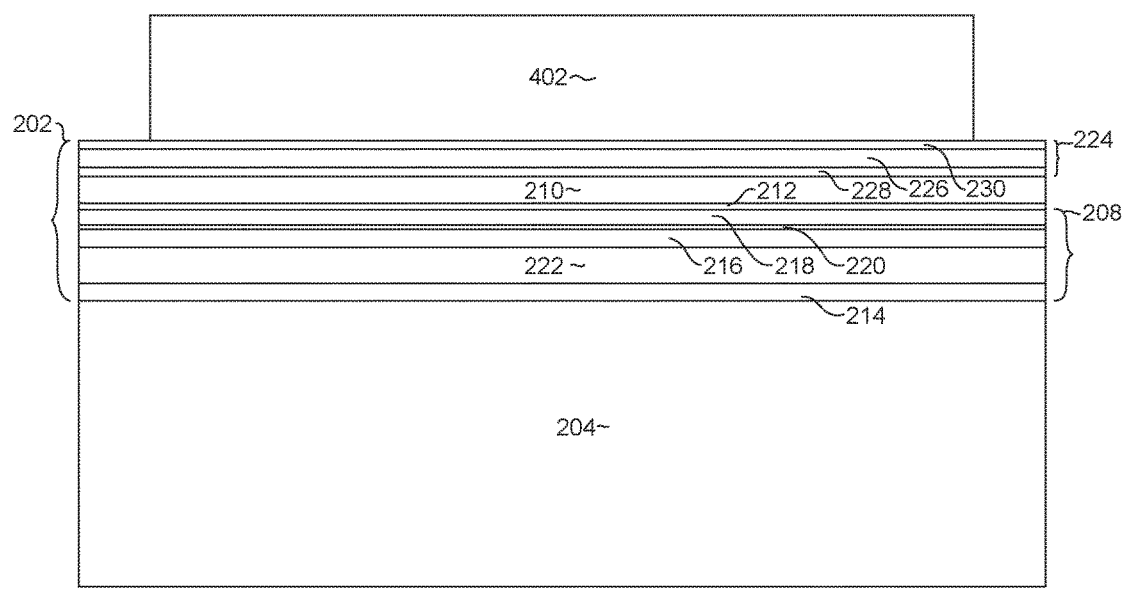
Figure 5:
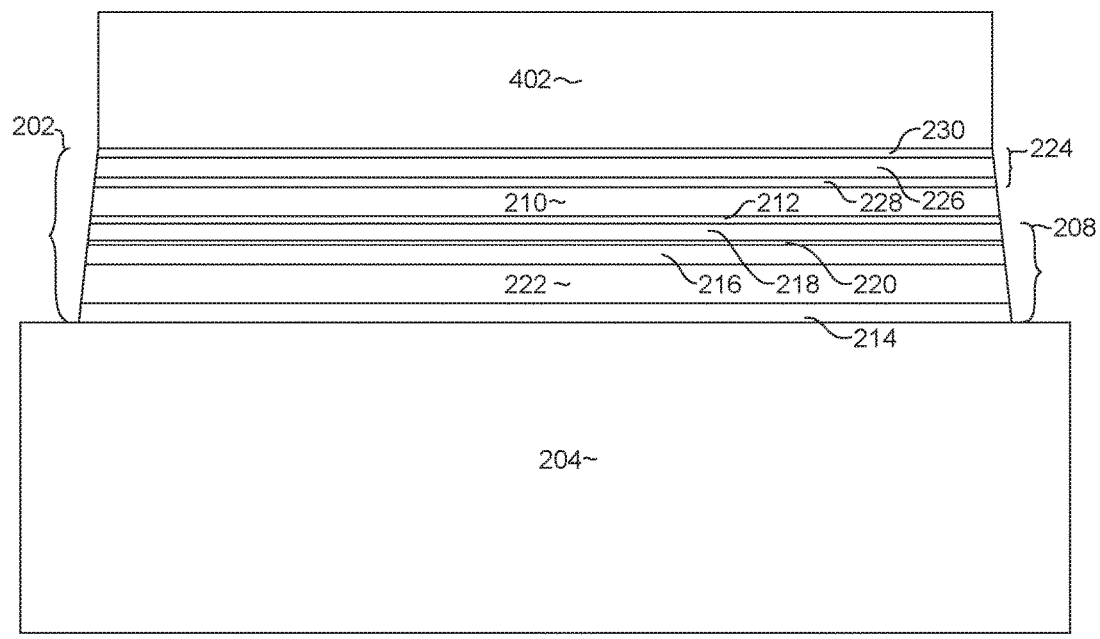

With reference to FIG. 4, a mask 402 is formed over the sensor stack layers 202. The mask 402 has a width that is configured to define a width of a pinned layer structure 208, as will be seen. With reference to FIG. 5 a material removal process such as ion milling is performed to remove portions of the sensor stack layers 202 that are not protected by the mask 402.

Figure 6:
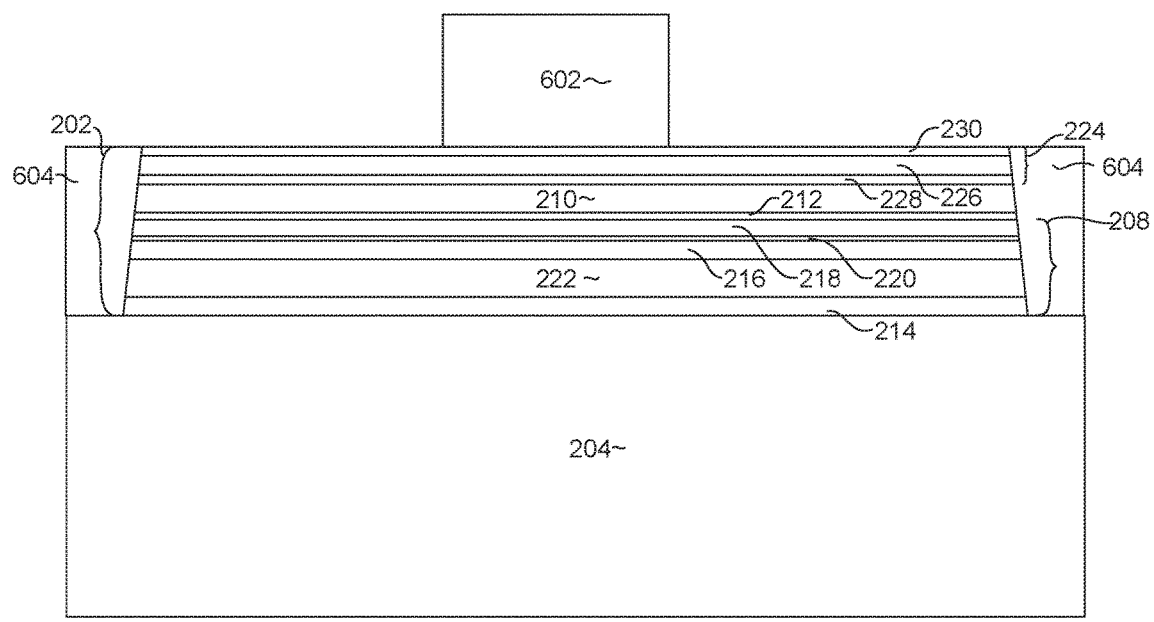

Then, a non-magnetic, electrically insulating fill layer such as alumina 604 is deposited and a chemical mechanical polishing process (CMP) is performed to remove the first mask and planarize the structure, leaving a structure as shown in FIG. 6. As seen in FIG. 6, a second mask 602 is formed over the sensor stack layers 202. This mask 602 has a width that is configured to define a magnetic free layer width and to therefore define the functional track-width of the sensor.

Figure 7:
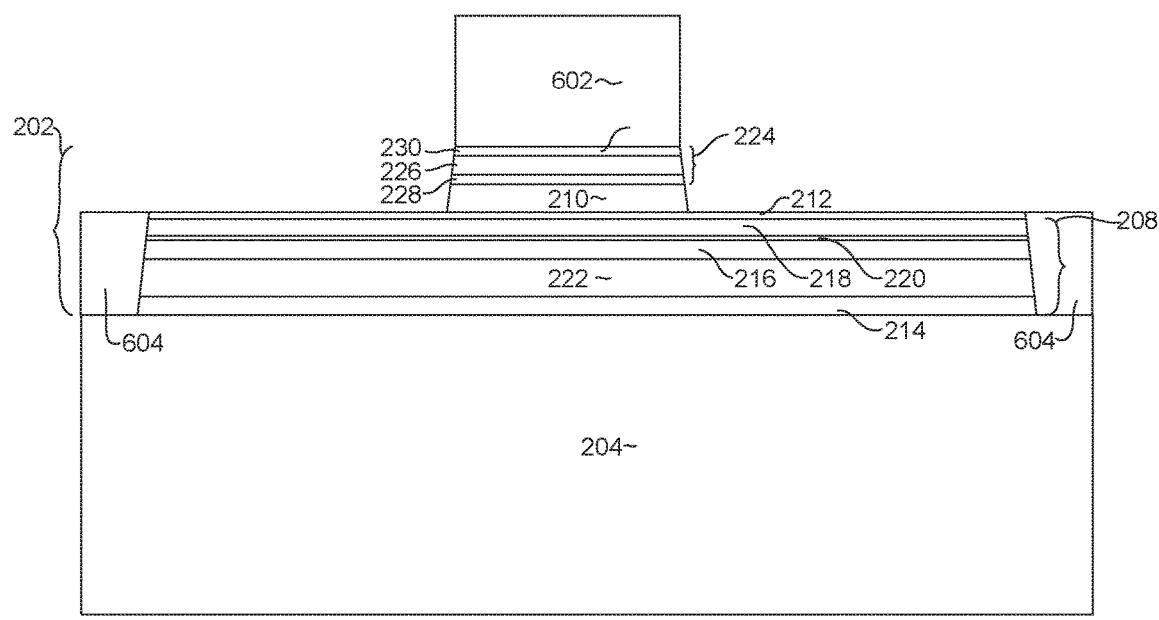

With reference now to FIG. 7, another material removal process such as ion milling is performed to remove portions of the capping layer 224 and magnetic free layer 210. This material removal process is terminated at or around the point where the non-magnetic spacer or barrier layer 212 has been reached.

Figure 8:
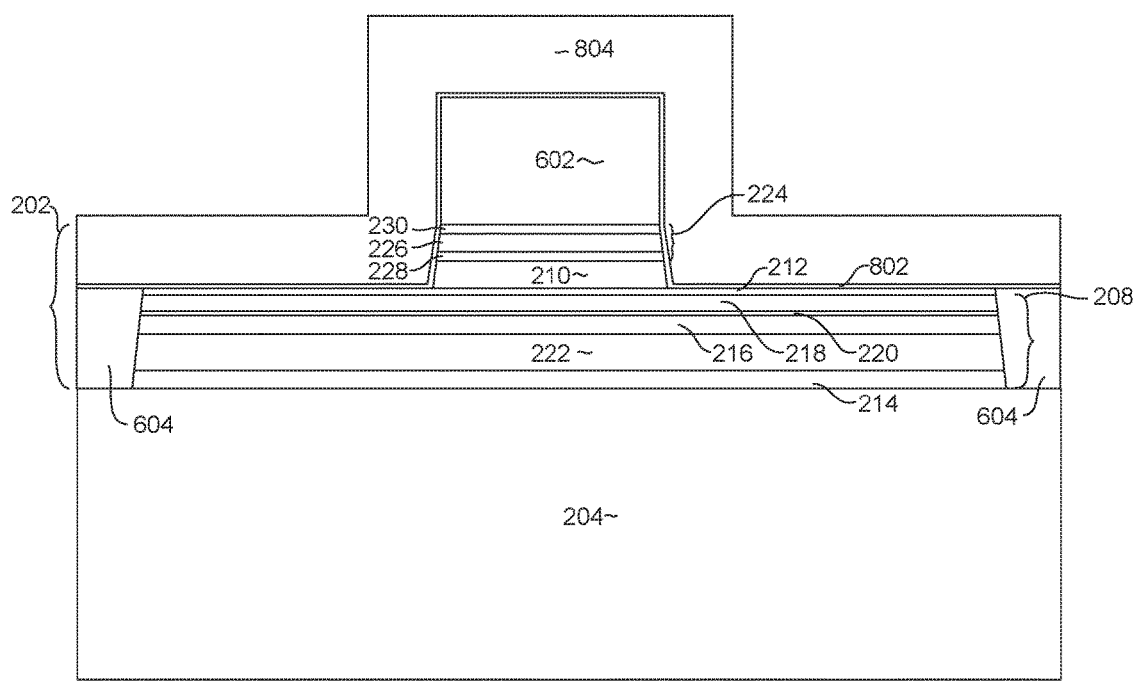

Then, with reference to FIG. 8, a thin, non-magnetic, electrically insulating layer 802 is deposited. This layer can be a material such as alumina or SiOx. A layer of magnetic side shield material 804 is then deposited over the insulation layer 802. The magnetic side shield material can be a magnetic material such as Co, Fe, Ni or alloys thereof.

Figure 9:
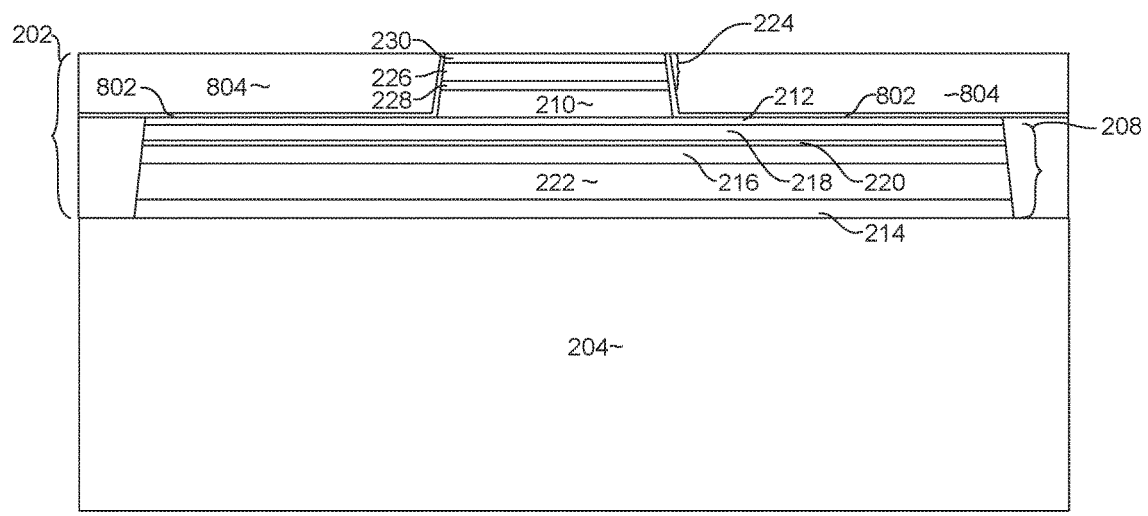

Then, another chemical mechanical polishing (CMP) process can be performed to remove the mask 602 and planarize the structure, leaving a stricture such as shown in FIG. 9. It will be appreciated here that, while the chemical mechanical polishing process may remove some of the second non-magnetic layer 230, and may affect the thickness of that layer, it will have no effect on the thickness of the magnetic layer 226 (e.g. the floating shield layer) nor on the underlying non-magnetic layer 228. Therefore, it can be seen that the thickness of the magnetic layer 226, as well as the non-magnetic layer 228 there-beneath, can be carefully controlled by deposition thickness without being affected by any material removal process such as chemical mechanical polishing, ion milling or mask liftoff processes. As a result, the thickness of the read gap is not affected by the chemical mechanical polishing process, which is difficult to accurately control.

Figure 10:
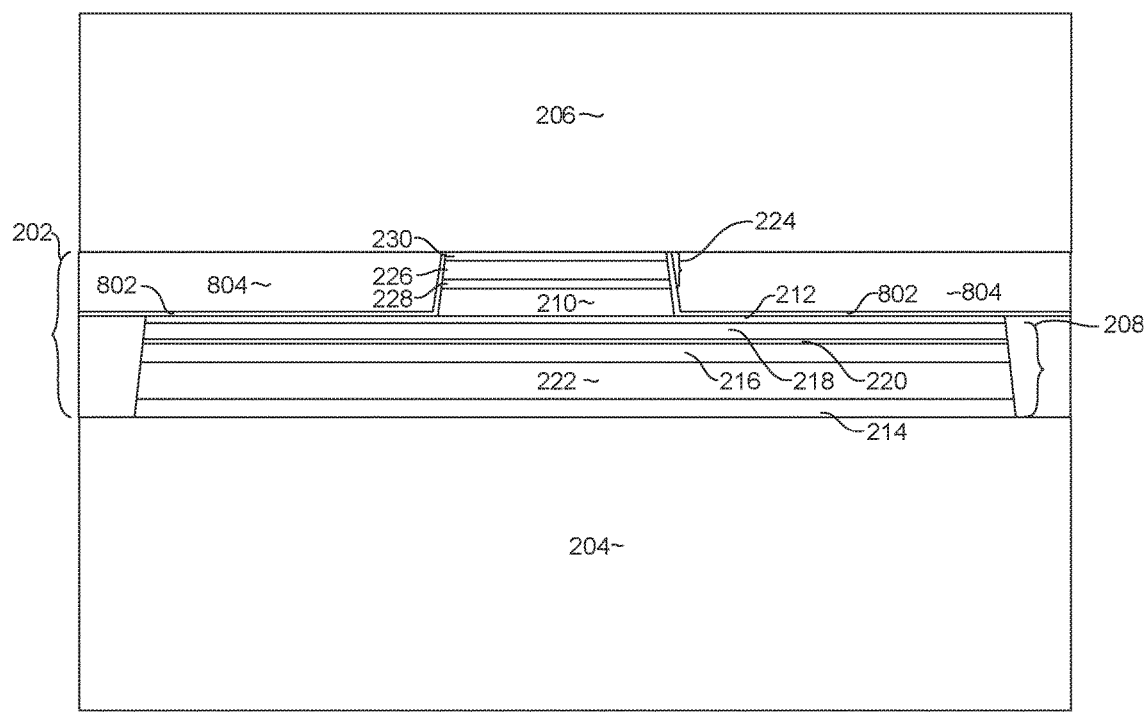

After the second chemical mechanical polishing process has been performed, an upper or trailing magnetic shield 206 can be deposited as shown in FIG. 10. It should be pointed out that, while the above illustrates a process for defining the width of a sensor, similar masking, ion milling, refining and chemical mechanical polishing processes can be employed to define the back edge (stripe height) of the sensor. From the above it can be seen that the magnetic layer 226 (floating magnetic shield) is formed in-situ with free layer 210 by the same processes used to define the shape of the free layer 210. Therefore, the magnetic layer 226 is self-aligned with the free layer as to have substantially the same size and shape as the free layer 210. This, therefore, allows the magnetic layer 226 to be formed with the same high magnetic permeability as the magnetic free layer, which as discussed above improves signal amplitude, signal to noise ratio and signal resolution.

While various embodiments have been described above, it should be understood that they have been presented by way of example only and not limitation. Other embodiments falling within the scope of the invention may also become apparent to those skilled in the art. Thus, the breadth and scope of the inventions should not be limited by any of the above-described exemplary embodiments, but should be defined only in accordance with the following claims and their equivalents.

What is claimed is:

1. A magnetic sensor, comprising:
  a magnetic free layer structure;
  a trailing magnetic shield; and
  a capping layer structure formed over the magnetic free layer structure, the capping layer structure comprising a top surface and side surfaces, the capping layer structure further comprising first and second non-magnetic layers and a magnetic layer located between the first and second non-magnetic layers,
  wherein the top surface of the capping layer structure contacts the trailing magnetic shield and separates the magnetic layer from the trailing magnetic shield,
  wherein the side surfaces of the capping layer structure are separated from the trailing magnetic shield by an insulating layer, and
  wherein the first non-magnetic layer is disposed directly on the magnetic free layer structure, the magnetic layer is disposed directly on the first non-magnetic layer, the second non-magnetic layer is disposed directly on the magnetic layer, and the trailing magnetic shield is disposed directly on the second non-magnetic layer.

2. The magnetic sensor as in claim 1, wherein the magnetic layer of the capping layer structure has a width in a track width direction that is substantially the same as a width of the magnetic free layer structure in the track width direction, and wherein the magnetic layer of the capping layer structure has a depth in a direction perpendicular to the track width direction that is substantially same as a depth of the magnetic free layer structure.

3. The magnetic sensor as in claim 1, wherein the magnetic layer of the capping layer structure comprises Fe, Co, Ni or an alloy thereof.

4. The magnetic sensor as in claim 1, wherein the first and second non-magnetic layers of the capping layer structure each comprise Ru, Rh, Hf, Ta, Cr or alloys thereof.

5. The magnetic sensor as in claim 1, further comprising a leading magnetic shield, the magnetic free layer structure and capping layer structure being located between the leading magnetic shield and the trailing magnetic shield.

6. The magnetic sensor as in claim 1, wherein the capping layer structure is located between the magnetic free layer structure and the trailing magnetic shield.

7. The magnetic sensor as in claim 1, wherein the magnetic layer of the capping layer structure has a high magnetic permeability.

8. A magnetic sensor, comprising:
  a magnetic free layer structure;
  a trailing magnetic shield; and
  a capping layer structure formed over the magnetic free layer structure, the capping layer structure comprising a top surface and side surfaces, the capping layer structure further comprising first and second non-magnetic layers and a magnetic layer located between the first and second non-magnetic layers, wherein the top surface of the capping layer structure contacts the trailing magnetic shield and separates the magnetic layer from the trailing magnetic shield, wherein the side surfaces of the capping layer structure are separated from the trailing magnetic shield by an insulating layer, and magnetization of the magnetic layer in the capping layer structure is biased in a same direction and substantially parallel as magnetization of the magnetic free layer structure, wherein the magnetic layer of the capping layer structure has a magnetic permeability that is substantially equal to a magnetic permeability of the magnetic free layer structure.

9. The magnetic sensor as in claim 1, wherein the magnetic layer of the capping layer structure has a magnetic permeability of at least 1000 H/m.

10. The magnetic sensor as in claim 1, wherein the magnetic layer of the capping layer structure has a thickness that is less than 4 nm.

11. A magnetic sensor, comprising:
a magnetic free layer structure;
a trailing magnetic shield; and
a capping layer structure formed over the magnetic free layer structure, the capping layer structure comprising a top surface and side surfaces, the capping layer structure further comprising first and second non-magnetic layers and a magnetic layer located between the first and second non-magnetic layers, wherein the top surface of the capping layer structure contacts the trailing magnetic shield and separates the magnetic layer from the trailing magnetic shield, wherein the side surfaces of the capping layer structure are separated from the trailing magnetic shield by an insulating layer, and magnetization of the magnetic layer in the capping layer structure is biased in a same direction and substantially parallel as magnetization of the magnetic free layer structure, wherein the first non-magnetic layer of the capping layer structure is located adjacent to the magnetic free layer structure and has a thickness of 1-4 nm, and the second non-magnetic layer of the capping layer structure is located away from the magnetic free layer structure and has a thickness of less than 2 nm.

12. A magnetic data recording device, comprising:
a housing;
a magnetic media held within the housing;
an actuator;
a slider connected with the actuator for movement adjacent to a surface of the magnetic media; and
a magnetic read sensor formed on the slider, the magnetic read sensor further comprising:
a magnetic free layer structure;
a trailing magnetic shield; and
a capping layer structure formed over the magnetic free layer structure, the capping layer structure comprising a top surface and side surfaces, the capping layer structure further comprising first and second non-magnetic layers and a magnetic layer located between the first and second non-magnetic layers, wherein the top surface of the capping layer structure contacts the trailing magnetic shield and separates the magnetic layer from the trailing magnetic shield, wherein the side surfaces of the capping layer structure are separated from the trailing magnetic shield by an insulating layer, and wherein the first non-magnetic layer is disposed directly on the magnetic free layer structure, the magnetic layer is disposed directly on the first non-magnetic layer, the second non-magnetic layer is disposed directly on the magnetic layer, and the trailing magnetic shield is disposed directly on the second non-magnetic layer.

13. The magnetic data recording device as in claim 12, wherein the magnetic layer of the capping layer structure has a width in a track width direction that is substantially the same as a width of the magnetic free layer structure in the track width direction, and wherein the magnetic layer of the capping layer structure has a depth in a direction perpendicular to the track width direction that is substantially same as a depth of the magnetic free layer structure.

14. The magnetic data recording device as in claim 12, wherein the magnetic layer of the capping layer structure comprises Fe, Co, Ni or an alloy thereof.

15. The magnetic data recording device as in claim 12, wherein the first and second non-magnetic layers of the capping layer structure each comprise Ru, Rh, Hf, Ta, Cr or alloys thereof.

16. The magnetic data recording device as in claim 12, further comprising a leading magnetic shield, the magnetic free layer structure and capping layer structure being located between the leading magnetic shield and the trailing magnetic shield.

17. The magnetic data recording device as in claim 12, wherein the capping layer structure is located between the magnetic free layer structure and the trailing magnetic shield.

18. The magnetic data recording device as in claim 12, wherein the magnetic layer of the capping layer structure has a magnetic permeability that is substantially equal to a magnetic permeability of the magnetic free layer structure.

19. The magnetic data recording device as in claim 12, wherein the magnetic layer of the capping layer structure has a magnetic permeability of at least 1000 H/m.

20. The magnetic sensor as in claim 1, wherein the magnetic layer of the capping layer structure is not magnetically connected with the trailing magnetic shield.

* * * * *